(12) United States Patent
Allyn et al.

(10) Patent No.: US 10,430,382 B2
(45) Date of Patent: Oct. 1, 2019

(54) DATA VISUALIZATION ARCHITECTURE

(71) Applicant: Microsoft Technology Licensing, LLC., Redmond, WA (US)

(72) Inventors: Barry Christopher Allyn, Snohomish, WA (US); Daniel J. Clay, Newcastle, WA (US); Qijin Zhou, Bellevue, WA (US); Peter H. Hufnagel, Seattle, WA (US); Michael Woolf, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/683,056

(22) Filed: Apr. 9, 2015

(65) Prior Publication Data

US 2016/0104306 A1    Apr. 14, 2016

Related U.S. Application Data

(60) Provisional application No. 62/063,741, filed on Oct. 14, 2014.

(51) Int. Cl.
*G06K 9/52* (2006.01)
*G06T 11/20* (2006.01)
(Continued)

(52) U.S. Cl.
CPC .............. *G06F 16/164* (2019.01); *G06K 9/52* (2013.01); *G06T 1/20* (2013.01); *G06T 11/003* (2013.01);
(Continued)

(58) Field of Classification Search
CPC ... G06T 11/206; G06T 11/60; G06T 2210/36; G06T 1/20; G06T 2200/28; G06T 15/005; G06T 19/00; G06K 9/52
(Continued)

(56) References Cited

U.S. PATENT DOCUMENTS 5,870,101 A    2/1999  Murata et al.
6,213,944 B1   4/2001  Miller
(Continued)

FOREIGN PATENT DOCUMENTS

EP    2592598 A2    5/2013

OTHER PUBLICATIONS

Fabian Nuñez. "An extended spreadsheet paradigm for data visualization systems, and its implementation", Master's thesis, University of Cape Town, Nov. 2000. At http://citeseer.ist.psu.edu/543469.html.*
(Continued)

*Primary Examiner* — Jin Cheng Wang

(57) ABSTRACT

A data visualization platform architecture that enables building of a data visualization via a one-directional chain of separate stages is provided, wherein each stage has a simple input interface and output interface. The staging of the architecture enables the data visualization to be provisioned while using fewer system resources and for additional behaviors to be applied to the visualization. Such behaviors include: transforming data from an arbitrary format, modular updates to data visualizations, client-independent operation, reduced-cost updating and extension of the platform, reduced-cost animations, etc. Aspects of the data visualization platform streamline and optimize the performance of a computing device that provides a data visualization.

20 Claims, 7 Drawing Sheets

(51) Int. Cl.

| | | |
|---|---|---|
| *G06T 11/40* | (2006.01) | |
| *G06T 11/60* | (2006.01) | |
| *G06T 13/20* | (2011.01) | |
| *G06T 17/10* | (2006.01) | |
| *G06T 19/20* | (2011.01) | |
| *G06T 1/20* | (2006.01) | |
| *G06F 16/16* | (2019.01) | |
| *G06T 11/00* | (2006.01) | |
| *G06T 15/08* | (2011.01) | |
| *G06T 13/80* | (2011.01) | |
| *G06T 15/40* | (2011.01) | |

(52) U.S. Cl.
CPC ............ *G06T 11/206* (2013.01); *G06T 11/40* (2013.01); *G06T 11/60* (2013.01); *G06T 13/20* (2013.01); *G06T 13/80* (2013.01); *G06T 15/08* (2013.01); *G06T 15/40* (2013.01); *G06T 17/10* (2013.01); *G06T 19/20* (2013.01); *G06T 2200/04* (2013.01); *G06T 2200/28* (2013.01); *G06T 2210/36* (2013.01); *G06T 2210/44* (2013.01); *G06T 2219/004* (2013.01); *G06T 2219/2012* (2013.01); *G06T 2219/2024* (2013.01)

(58) Field of Classification Search
USPC .......................... 345/440, 619, 418, 419, 660
See application file for complete search history.

(56) References Cited

U.S. PATENT DOCUMENTS

| | | | |
|---|---|---|---|
| 6,359,629 B1 | 3/2002 | Hopcroft et al. | |
| 6,480,205 B1 | 11/2002 | Greene et al. | |
| 6,636,215 B1 | 10/2003 | Greene | |
| 6,995,768 B2* | 2/2006 | Jou | G06F 9/542 |
| | | | 345/440 |
| 7,023,440 B1* | 4/2006 | Havekost | G05B 23/0267 |
| | | | 345/440 |
| 7,334,197 B2 | 2/2008 | Robertson et al. | |
| 8,090,776 B2 | 1/2012 | Torres et al. | |
| 8,527,458 B2 | 9/2013 | Park et al. | |
| 8,589,425 B2 | 11/2013 | Gonzalez et al. | |
| 8,638,343 B2* | 1/2014 | Allyn | G06T 15/005 |
| | | | 345/418 |
| 8,990,258 B2* | 3/2015 | Bhatia | G06F 17/30893 |
| | | | 707/768 |
| 9,250,926 B2 | 2/2016 | Allyn et al. | |
| 2004/0030758 A1 | 2/2004 | Cherdron et al. | |
| 2004/0068491 A1 | 4/2004 | Iline et al. | |
| 2004/0252136 A1* | 12/2004 | Bhatt | G06F 17/30554 |
| | | | 345/619 |
| 2005/0140694 A1 | 6/2005 | Subramanian | |
| 2007/0153004 A1 | 7/2007 | Airey | |
| 2007/0153006 A1 | 7/2007 | Robbins et al. | |
| 2007/0185904 A1 | 8/2007 | Matsuzawa et al. | |
| 2008/0034292 A1 | 2/2008 | Brunner | |
| 2008/0192056 A1 | 8/2008 | Robertson et al. | |
| 2009/0125809 A1 | 5/2009 | Trapani et al. | |
| 2009/0140978 A1 | 6/2009 | Louch | |
| 2009/0217163 A1 | 8/2009 | Jaroker | |
| 2009/0327921 A1 | 12/2009 | Holm-Peterson et al. | |
| 2010/0162152 A1* | 6/2010 | Allyn | G06F 3/0481 |
| | | | 715/767 |
| 2010/0214299 A1 | 8/2010 | Robertson | |
| 2010/0277507 A1* | 11/2010 | Allyn | G06T 15/005 |
| | | | 345/660 |
| 2010/0312803 A1 | 12/2010 | Gong et al. | |
| 2011/0285727 A1 | 11/2011 | Fernandez | |
| 2012/0023077 A1 | 1/2012 | Kann et al. | |
| 2012/0124159 A1 | 5/2012 | Takahashi | |
| 2012/0218254 A1* | 8/2012 | Abeln | G06T 11/206 |
| | | | 345/419 |
| 2012/0229445 A1 | 9/2012 | Jenkins | |
| 2012/0313957 A1 | 12/2012 | Fisher et al. | |
| 2013/0120358 A1 | 5/2013 | Fan | |
| 2013/0179791 A1 | 7/2013 | Polski et al. | |
| 2013/0204841 A1 | 8/2013 | Obusek | |
| 2013/0215043 A1 | 8/2013 | Olomskiy | |
| 2013/0271472 A1 | 10/2013 | Duran | |
| 2013/0346899 A1 | 12/2013 | Cole et al. | |
| 2014/0043325 A1 | 2/2014 | Ruble | |
| 2014/0108449 A1 | 4/2014 | Peloski | |
| 2014/0125672 A1 | 5/2014 | Winternitz et al. | |
| 2014/0149669 A1 | 5/2014 | Kim et al. | |
| 2014/0298170 A1 | 10/2014 | Mercille | |
| 2014/0337703 A1* | 11/2014 | Gong | G06F 17/30572 |
| | | | 715/215 |
| 2015/0346972 A1* | 12/2015 | Boekling | G06T 11/206 |
| | | | 703/2 |
| 2016/0004544 A1 | 1/2016 | Paraschivescu | |
| 2016/0103828 A1 | 4/2016 | Woolf | |
| 2016/0103872 A1* | 4/2016 | Prophete | G06F 17/30398 |
| | | | 707/722 |
| 2016/0104307 A1 | 4/2016 | Allyn | |
| 2016/0104308 A1 | 4/2016 | Allyn | |
| 2016/0104311 A1 | 4/2016 | Allyn | |
| 2016/0104318 A1 | 4/2016 | Allyn | |

OTHER PUBLICATIONS

Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>>, Aug. 30, 2014, 7 Pages.

"International Search Report & Written Opinion Issued in PCT Application No. PCT/US2015/054110", dated Jan. 27, 2016, 13 Pages.

"International Search Report Issued in PCT Application No. PCT/US2015/055416", dated Feb. 4, 2016, 12 Pages.

"International Search Report and Written Opinion Issued in PCT Application No. PCT/US2015/055417", dated Feb. 19, 2016, 11 Pages.

Nunez, et al., "Vissh: A Data Visualisation Spreadsheet", In Proceedings of the Joint Eurographics and IEEE TCVG Symposium on Visualization, Data Visualization, Retrieved on: May 29, 2000, 10 Pages.

Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>>, Aug. 30, 2014, 4 Pages.

Arora, Ankush, "Google ChartsTool for Visualization Week 7 Report", Retrieved from <<http://docplayer.net/8390711-Google-charts-tool-for-visualization-week-7-reportankush-arora.html>>, Jun. 28, 2014, 25 Pages.

International Search Report and Written Opinion Issued in PCT Application No. PCT/US2015/055415, dated Feb. 15, 2016, 13 Pages.

Eskroch, "Point Culling #6", Retrieved at<<https://github.com/core-plot/core-plot/issues/6>>, Dec. 29, 2013, pp. 1-2.

Shen, et al., "On Point Feature Automatic Annotation Placement in 3D Environment", Retrieved at <<http://www.isprs.org/proceedings/XXXVII/congress/2_pdf/9_ThS-4/05.pdf>>, Jan. 1, 2008, 4 Pages.

Stolte, et al., "Polaris: A System for Query, Analysis, and Visualization of Multidimensional Relational Databases", In Proceedings of IEEE Transactions on Visualization and Computer Graphics, vol. 8, No. 1, Jan. 2002, 14 pages.

Petricek, et al., "Tutorial: Creating Charts with Real-Time Data", Published on: Jan. 2010 Available at: http://msdn.microsoft.com/en-us/library/vstudio/hh297119%28v=vs.100%29.aspx.

U.S. Appl. No. 14/683,110, Office Action dated Jul. 12, 2016, 24 pages.

U.S. Appl. No. 14/683,091, Office action dated Apr. 20, 2016, 50 pages.

(56) References Cited

OTHER PUBLICATIONS

U.S. Appl. No. 14/683,079, Office action dated Apr. 20, 2016, 47 pages.
U.S. Appl. No. 14/683,085, filed Apr. 9, 2015 entitled "Modular Updating of Visualizations".
U.S. Appl. No. 14/683,091, filed Apr. 9, 2015 entitled "Performance Optimization for Data Visualization".
U.S. Appl. No. 14/683,100, filed Apr. 9, 2015 entitled "Animation Framework".
U.S. Appl. No. 14/683,110, filed Apr. 9, 2015 entitled "Annotated Geometry".
U.S. Appl. No. 14/683,079, filed Apr. 9, 2015 entitled "Data Visualization Extensibility Architecture".
U.S. Appl. No. 14/683,110, Office Action dated May 30, 2017, 30 pages.
U.S. Appl. No. 14/683,079, Amendment and Response filed Apr. 28, 2017, 10 pages.
U.S. Appl. No. 14/683,079, Office Action dated May 17, 2017, 71 pages.
PCT 2nd Written Opinion in International Application PCT/US2015/055416, dated Aug. 19, 2016, 7 pages.
U.S. Appl. No. 14/683,091, Amendment and Response filed Dec. 6, 2016, 11 pages.
U.S. Appl. No. 14/683,079, Amendment and Response filed Dec. 13, 2016, 10 pages.
U.S. Appl. No. 14/683,110, Amendment and Response filed Oct. 13, 2016, 10 pages.
U.S. Appl. No. 14/683,110, Office Action dated Nov. 16, 2016, 30 pages.
U.S. Appl. No. 14/683,091, Office Action dated Jan. 5, 2017, 87 pages.
U.S. Appl. No. 14/683,079, Office Action dated Dec. 29, 2016, 69 pages.
U.S. Appl. No. 14/683,100, Amendment and Response filed Jan. 19, 2017, 15 pages.
U.S. Appl. No. 14/683,100 Office Action dated Mar. 6, 2017, 42 pages.
U.S. Appl. No. 14/683,110, Amendment and Response filed Feb. 15, 2017, 10 pages.
U.S. Appl. No. 14/683,100, Office Action dated Nov. 27, 2017, 48 pages.
U.S. Appl. No. 14/683,110, Amendment and Response filed Oct. 30, 2017, 12 pages.
U.S. Appl. No. 14/683,110, Office Action dated Dec. 13, 2017, 31 pages.
European Office Action in Application 13728050.9, dated May 26, 2017, 3 pages.
U.S. Appl. No. 14/683,091, Amendment and Response filed Jul. 5, 2017, 15 pgs.
U.S. Appl. No. 14/683,085, Office Action dated Jul. 19, 2017, 21 pages.
U.S. Appl. No. 14/683,091, Office Action dated Aug. 7, 2017, 93 pages.
U.S. Appl. No. 14/683,100, Amendment and Response filed Aug. 1, 2017, 14 pages.
U.S. Appl. No. 14/683,085, Notice of Allowance dated Jan. 31, 2018, 7 pages.
U.S. Appl. No. 14/683,085, Amendment and Response filed Jan. 17, 2018, 19 pages.
"Final Office Action issued in U.S. Appl. No. 14/683,100", dated May 24, 2018, 51 Pages.
"Non Final Office Action issued in U.S. Appl. No. 14/683,110", dated May 30, 2018, 35 Pages.
"International Preliminary Report on Patentability Issued in PCT Application No. PCT/US2015/055415", dated Jan. 27, 2017, 8 Pages.
"International Preliminary Report on Patentability Issued in PCT Application No. PCT/US2015/055416", dated Jan. 27, 2017, 8 Pages.
"International Preliminary Report on Patentability Issued in PCT Application No. PCT/US2015/055417", dated Jan. 25, 2017, 10 Pages.
"Final Office Action Issued in U.S. Appl. No. 14/683,100", dated Feb. 4, 2019, 48 Pages.
"Office Action Issued in European Patent Application No. 15785012.4", dated Oct. 26, 2018, 7 Pages.
"Non Final Office Action Issued in U.S. Appl. No. 14/683,100", dated Sep. 27, 2018, 45 Pages.
U.S. Appl. No. 14/683,100, Office Action dated Jul. 20, 2016, 27 pages.
U.S. Appl. No. 14/683,110, Office Action dated Jul. 7, 2016, 24 pages.
U.S. Appl. No. 14/683,091, Amendment and Response filed Aug. 22, 2016, 11 pgs.
U.S. Appl. No. 14/683,091, Office action dated Sep. 8, 2016, 43 pages.
PCT 2nd Written Opinion in International Application PCT/US2015/055415, dated Aug. 19, 2016, 7 pgs.
U.S. Appl. No. 14/683,079, Amendment and Response filed Aug. 22, 2016, 11 pages.
U.S. Appl. No. 14/683,079, Office action dated Sep. 13, 2016, 71 pages.
PCT 2nd Written Opinion in International Application PCT/US2015/055417, dated Sep. 15, 2016, 9 pgs.

* cited by examiner

MOBILE COMPUTING DEVICE

DATA VISUALIZATION ARCHITECTURE

CROSS REFERENCE TO RELATED APPLICATIONS

This application claims the benefit of U.S. Provisional Patent Application No. 62/063,741, titled "Data Visualization" filed Oct. 14, 2014.

BACKGROUND

Data visualization is a process for graphically representing data in a visualization, for example, a chart, an infographic, a map, a gauge, etc. It is with respect to these and other considerations that examples will be made.

SUMMARY

This summary is provided to introduce a selection of concepts in a simplified form that are further described below in the Detailed Description section. This summary is not intended to identify all features of the claimed subject matter, nor is it intended to limit the scope of the claimed subject matter.

Aspects of the present disclosure provide a data visualization platform architecture. The architecture enables building of a data visualization (e.g., a chart, an infographic, a map, a gauge, etc.) via a one-directional chain of separate stages, each stage having a simple input interface and output interface.

Examples may be implemented as a computer process, a computing system, or as an article of manufacture such as a computer program product or computer readable media. The computer program product may be a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of other aspects of the present disclosure.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
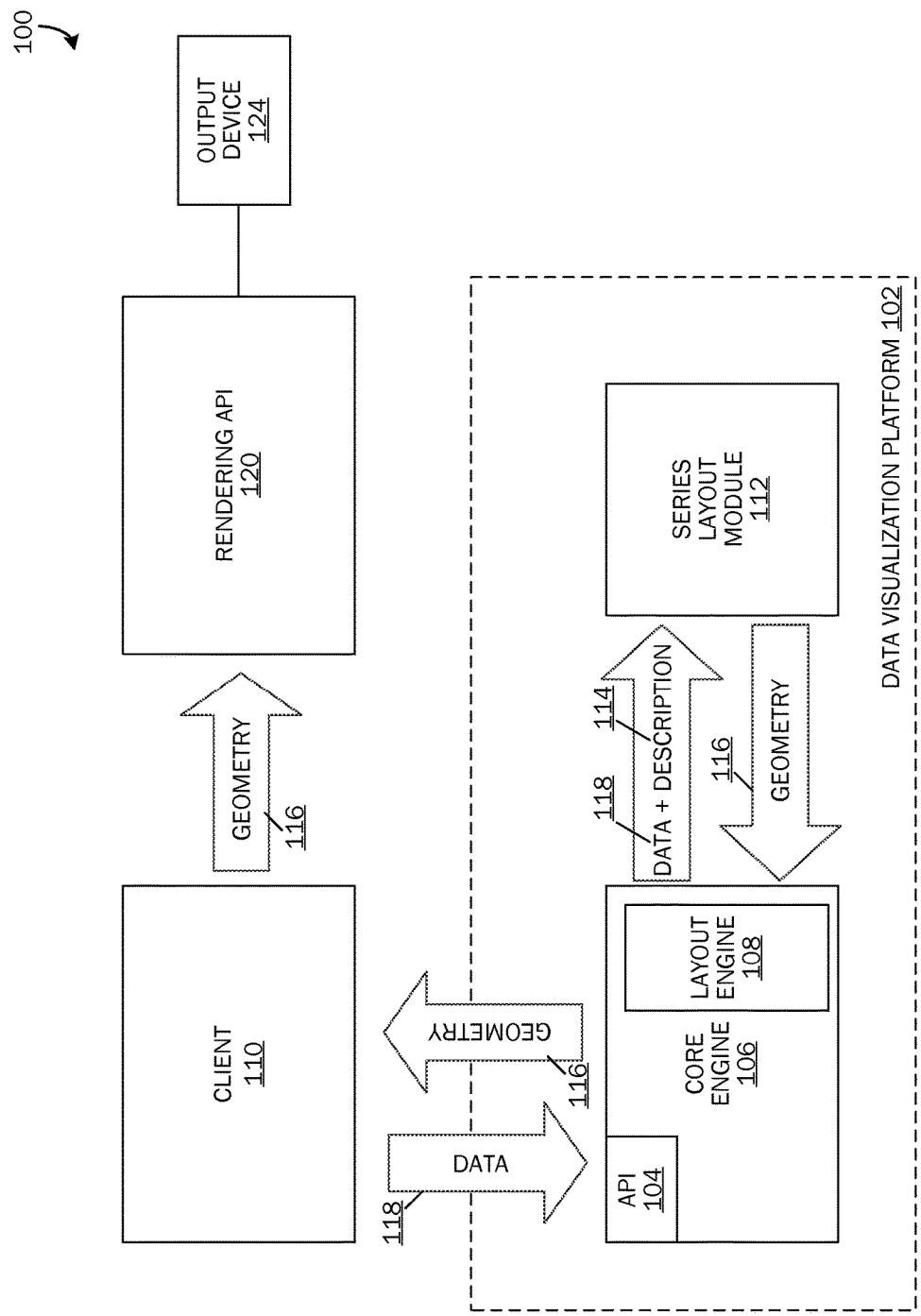
FIG. 1 is an example block diagram of system including a data visualization platform.

The following detailed description refers to the accompanying drawings. Wherever possible, the same reference numbers are used in the drawings and the following description to refer to the same or similar elements. While aspects of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the disclosure is defined by the appended claims. Examples may take the form of a hardware implementation, or an entirely software implementation, or an implementation combining software and hardware aspects. The following detailed description is, therefore, not to be taken in a limiting sense.

Examples of the present disclosure are directed to providing a data visualization platform architecture. According to an aspect, the architecture enables the building of a data visualization (e.g., a chart, an infographic, a map, a gauge, etc.) via a one-directional chain of separate stages, each stage having a simple input interface and output interface.

FIG. 1 is an example block diagram of a system 100 including a data visualization platform 102. The data visualization platform 102 is illustrated as comprising a core engine 106, a layout engine 108, a series layout module 112 to provide one or a plurality of series layouts, and an Application Programming Interface (API) 104 for interacting with a client 110. The client 110 in various aspects may be one of various types of client applications that may run on various types of platforms or operating systems. That is, the data visualization platform 102 is not tied to a specific client application or to a specific platform, is not biased toward a specific programming language, data source, or a specific set of features, and is compatible with all graphics stacks. According to aspects, the data visualization platform 102 is operable to receive a set of data, transform the data into a normalized form ready for layout, take the normalized data and build a hierarchical scene graph of visual elements comprised of geometry or text, and provide a data context-aware set of geometry and text that the client 110 can render.

The client 110 links to the data visualization platform 102 and implements callback interfaces which are used to fetch single data dimensions (e.g., x/y, x/y/r, etc.) and to calculate text sizes and provide client context (e.g., surface description 114). The client 110 builds a definition of a visualization and feeds the data 118 defining the visualization to the data visualization platform 102 via the API 104. For example, the client 110 defines the visualization through the API 104 by adding and configuring shared objects (e.g., chart, series, axes, legend, and other objects used in common by data series within a visualization) within its set. The API 104 passes the data to the layout engine 108. The client 110 may optionally implement one or more data transforms to transform data into a format that the layout engine 108 can use. For example, if the data is in the form of raw user data (e.g., a table of data from a spreadsheet application), a data transformation may include sorting, filtering, or converting the data into a normalized form.

According to aspects, the client 110 signals the data visualization platform 102 to have the geometry laid out for a given type of visualization when the client 110 renders, hit tests, or performs other functions for which it needs to know the layout. According to aspects, the data visualization platform 102 positions objects within the visualization and creates their geometries. In various aspects, a series layout module 112 comprises series layouts that draw geometry for each series of data within a plot area in a specific format (e.g., columns for column series, markers for scatter series, bubbles for bubble series, etc.). According to aspects, the series layout module 112 is operable to produce annotated geometry 116 from a limited and immutable view of the data 118 and surface description 114. That is, the series layout module 112 takes a set of data plus a surface description 114 (e.g., visualization type, visualization size, client resolution/ dpi, coordinate space, etc.) as inputs, and produces a collection of annotated geometry 116 as output. In some aspects, the annotated geometry 116 is cached in a series object, and the series layout module 112 is not invoked again unless layout is required. In various aspects, the core engine 106 is operable to process the annotated geometry 116 and to deliver shared functionalities (e.g., titles, axes, legends, colors, etc.) of the series and data points without assistance from the series layout module 112.

The annotated geometry 116 is cached so that it can be iterated for animation or other interactivities without having to repeat layout, and may be stored in various forms according to various aspects. In one example, the cached information comprises a tree of element objects, where the root object is the visualization (e.g., chart, infographic, map, gauge, etc.), and child elements include shared objects such as a legend, a plot area, chart elements (e.g., for data, series, or legend entries, a chart title, axis titles, etc.). According to another example, annotated geometries 116 can be stored as path geometry (e.g., area charts, surface charts, radar charts, trend lines, etc.). According to another example, annotated geometry 116 can be stored as a formula. For example, in a business chart plotting supply and demand curves, functions describing the curves are stored. Accordingly, the geometry can be synthesized during rendering. For example, in cases of simple layout (e.g., line charts, column charts, etc.) that are computationally inexpensive and where the data is local, annotated geometry 116 may be synthesized directly from the data 118.

The client 110 is operable in various aspects to request drawing instructions from the data visualization platform 102 by asking questions, for example, what is the geometry of the visualization, where is it located, what is the text, etc.

According to an aspect, once the geometry has been created by the series layout module 112, the layout engine 108 is operable to plot an initial visualization. In several aspects, the layout engine 108 assembles geometries generated by the series layout module 112 and sets positions of objects, which represent data points within a visualization, as well as shared objects (e.g., axes, labels, legends, etc.). Once plotting is complete, in some aspects, the data that were plotted are cached internally within the visualization. According to aspects, the layout engine 108 sends the plotted objects to the client 110 via a limited set of primitives (e.g., lines, Beziers, etc.) which can be passed directly to an appropriate rendering API or to an additional module or engine for further processing. From these primitives, any geometry can be approximated. Each object in the visualization can be given its own layer as necessary or be represented within a flattened object along with several other objects in its hierarchy.

According to aspects, the client 110 provides an interface via which the data visualization platform 102 sends a normalized form of the shared objects and annotated geometry 116. That is, clients 110 do not have direct access to the internalized geometry, but instead are exposed to a normalized form transmitted to them via a simple protocol, for example, via a sink interface. According to aspects, the client 110 renders each object's geometry via a recursive walk of the scene graph, wherein the geometry is sequentially processed. For two-dimensional geometry, the geometry protocol describes path geometry as a series of figures (e.g., rectangles) that contain segments (e.g., lines or Beziers, also referred to as primitives) which can be passed directly to an appropriate rendering API 120 to communicate drawing instructions to an output device 124 such as a monitor, screen, printer, or other display device. For three-dimensional geometry, meshes are served rather than figures and segments. Although a visualization does not render itself, in aspects it can offer up per-object storage for formatting properties and effects such as colors, line patterns, etc. via an optional 'format' object which hangs off each object in the tree, wherein the format object is a simple collection of predefined properties that the client 110 can set when building a visualization and then later retrieve during rendering.

Figure 2:
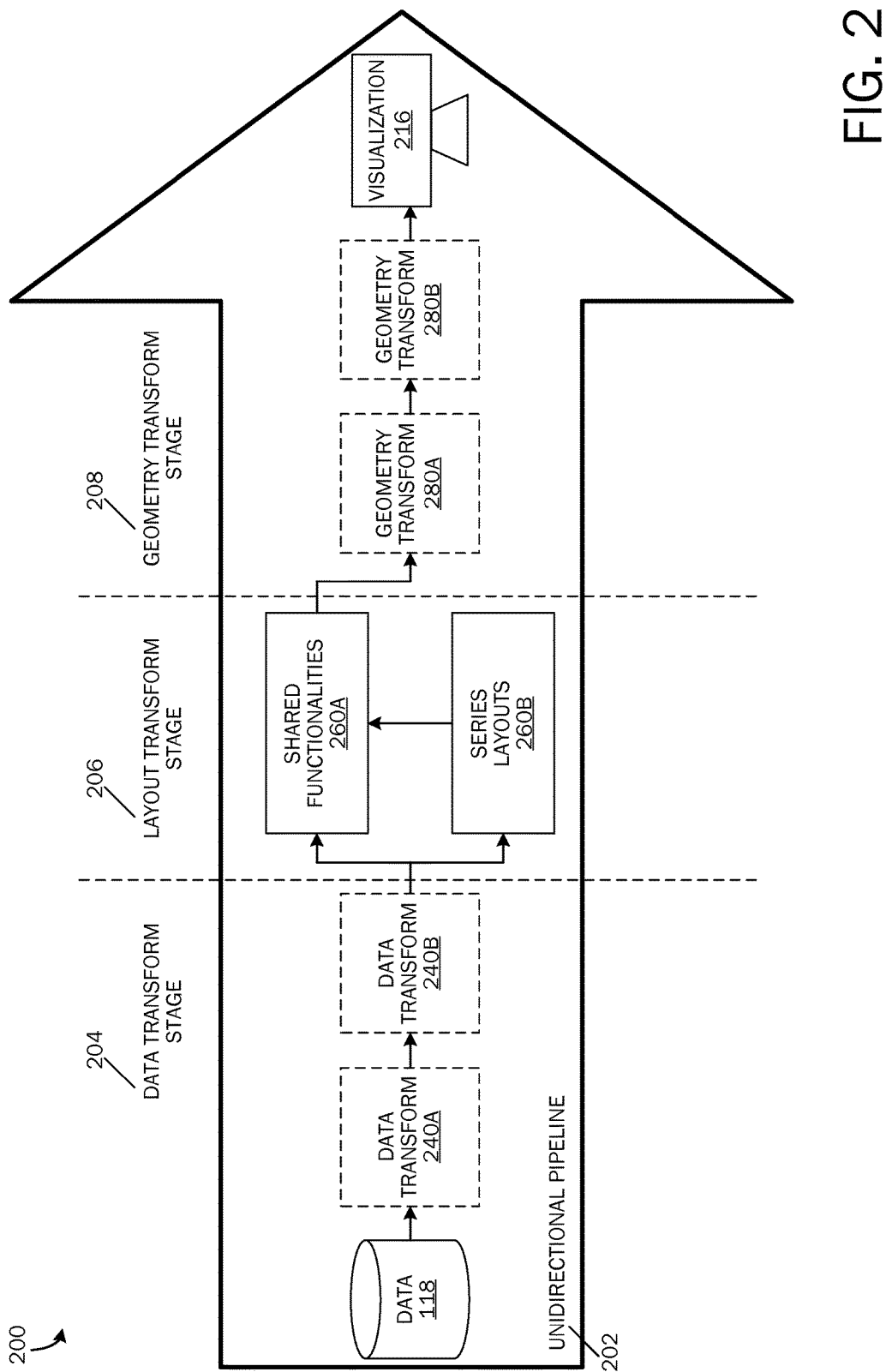
FIG. 2 illustrates a pipelined architecture in which data flows in a single direction.

FIG. 2 illustrates a pipelined architecture 200 in which data flows in a single direction. According to aspects, the pipelined architecture 200 provides a unidirectional pipeline 202 in which data flows in one direction. The pipeline 202, is illustrated in several stages 204, 206, 208, where, according to aspects, chains of transformations may be applied. According to aspects, at each stage in the pipeline 202, there is a well-defined input and output interface. The combination of being unidirectional and the normalization of input/ output provides extensibility, for example, by enabling clients 110 to extend a visualization's capabilities by inserting one or more transforms of the appropriate type into the chain (i.e., pipeline 202). According to an aspect, the one or more transforms may be implemented at a stage in platform independent code, for example, C++ or C#. According to aspects, as data flows through the pipeline 202, each stage optionally enriches data with further meta-information such that the end result is a data context-aware set of geometry and text that clients 110 can use to build highly-interactive and visual user experiences.

According to aspects, the data transform stage 204 in the pipeline 202, is where data transforms are optionally applied. According to aspects, the data transform stage 204 occurs as the client 110 feeds data 118 to the core engine 106 via the API 104 to define and create the visualization 216. Data transforms 240A, 240B are illustrated as optional transforms that may be implemented by the client 110 to transform raw user data 118 into a normalized form ready for layout for the visualization 216. For example, data transformations may include sorting, filtering, or converting the data 118 into a form that can be used by the layout engine 108. If the data 118 is already in normalized form, the client 110 does not have to implement data transforms 240 or may use a "pass-through" transform.

As illustrated in FIG. 2, the layout transformation stage 206 is the next stage in the pipeline 202. According to aspects, the layout transform stage 206 occurs when the client 110 is ready to render, hit test, or perform a function for which it needs to know the layout. According to aspects, during the layout stage 206, objects within the visualization 216 are positioned, and their geometries are built. According to an aspect, layout transforms 260 take normalized data and build a hierarchical scene graph of visual elements comprised of annotated geometry 116 or text. Layout transforms 260 include shared functionalities 260A (e.g., colorization, trend lines, data labels, and other functionalities used in common by data series within a visualization) and series layouts 260B, which create the annotated geometry 116 for individual data series. According to aspects, the annotated geometry 116 is encoded with meta-information such that any renderer can have semantic understanding or context around the vectors. According to aspects, the outputted annotated geometry 116 is then cached.

According to aspects, the geometry transform stage 208 in the pipeline 202, is where geometry transforms are optionally applied. According to aspects, when the client 110 interrogates the data visualization platform 102 (e.g., to render the visualization 216, render animation, build interactivities etc.), the client 110 may optionally insert one or more geometry transforms 280 to modify the visualization 216. For example, the client 110 may insert one or more geometry transforms 280A, 280B to modify the styling of the visualization, convert to pixel space, apply snapping, geometry culling, warp effects, hand drawn effects, projections, and three-dimensional surfaces mapping, change the color of certain data points, etc. By inserting one or more geometry transforms 280, the client 110 is enabled to alter the appearance of a visualization 216 or effectively produce a new visualization type. For example, consider a bubble chart where a geometry transform 208 is injected that colorizes the chart based on areas of density, and accordingly transforms the bubble chart into a heat map visualization.

Because, in various aspects, the data flow of the data visualization platform 102 is segmented, the client 110 is enabled to produce a vast number of visualizations by assembling the pipeline 202 to build visualizations 216. According to aspects, as the client 110 queries the data visualization platform 102 for the annotated geometry 116, the client 110 provides a sink interface, and accordingly, the normalized form of the objects and annotated geometry 116 (which may or may not include transformed geometries) are transmitted to the client 110 via the sink interface. Accordingly, the client 110 is operable to pass the annotated geometry 116 to an appropriate rendering API 120.

Figure 3:
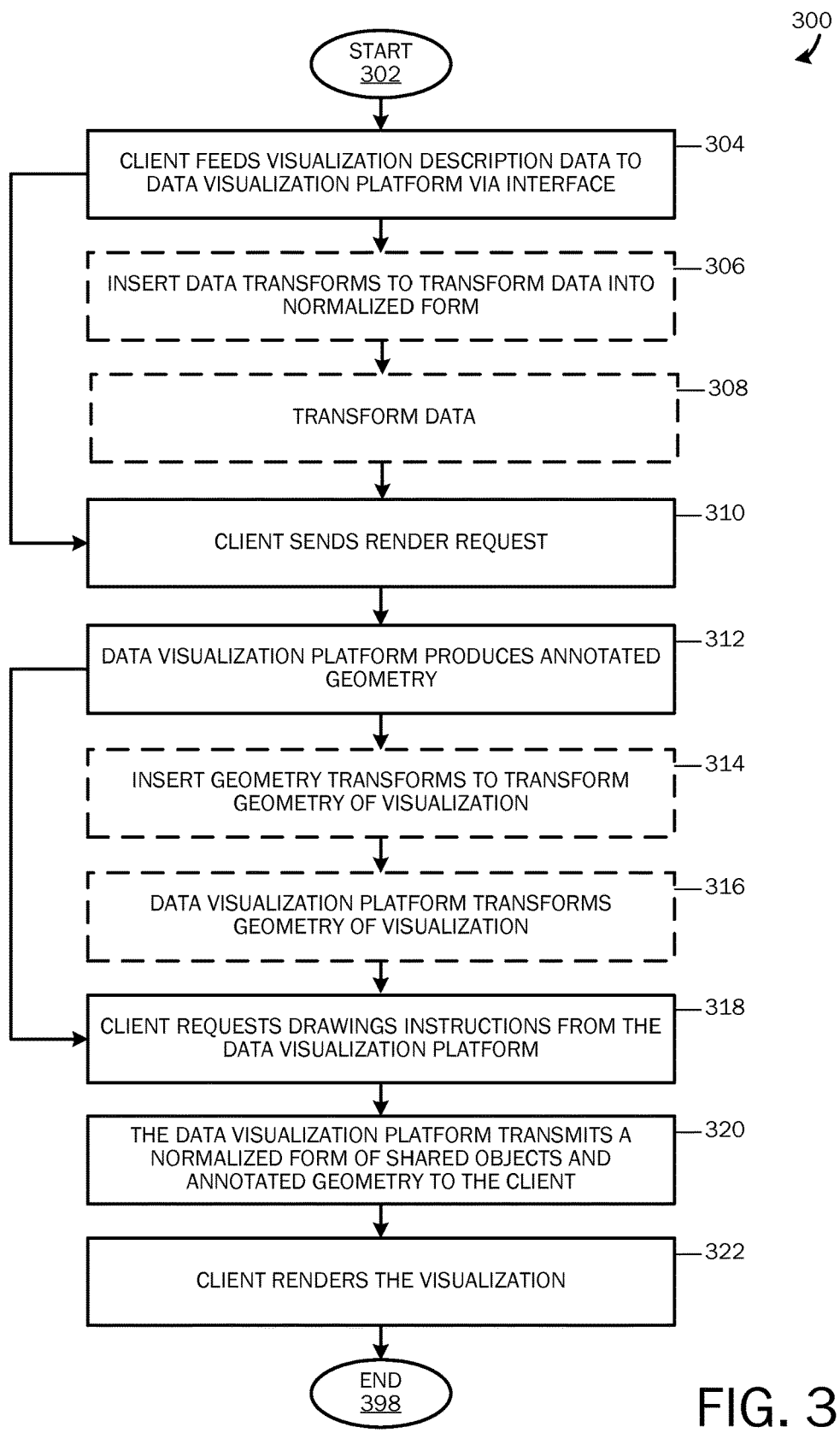
FIG. 3 is a flow chart of an example method for providing functions of a data visualization platform.

FIG. 3 is a flow chart of an example method 300 for providing functions of a data visualization platform 102. Method 300 begins at starting block 302 and proceeds to OPERATION 304, where the client 110 provides data 118 to be graphically represented in a visualization. For example, client 110 may send a request to the data visualization platform 102 via API 104 to create a visualization such as a chart, an infographic, a map, a gauge, etc.

The method 300 optionally proceeds to OPERATION 306, where, if the client data 118 is not in a format that can be used by the layout engine 108, the client 110 is operable according to aspects to insert one or more data transforms 240A, 240B to transform raw user data 118 into a normalized format ready for layout. According to other aspects, data transforms 240 may be inserted by the data visualization platform 102. The method 300 proceeds from OPERATION 306 to OPERATION 308, where the data 118 is transformed (e.g., sorted, filtered, converted into a normalized form, etc.).

In aspects where the data 118 is received according to the normalized form, the data transforms 204 are not implemented (or a pass-through transform is applied), and the method 300 proceeds from OPERATION 304 to OPERATION 310.

At OPERATION 310, a request to render the visualization is sent. For example, the client 110 may request rendering of the visualization according to a user command. After the render request is received at OPERATION 310, the method 300 proceeds to OPERATION 312, where, according to aspects, the data visualization platform 102 produces annotated geometry 116. According to aspects, layout transforms 260 are inserted, objects within the visualization are positioned, and their geometries are built when annotated geometry 116 is produced. According to an aspect, a hierarchical scene graph of visual elements comprised of geometry or text is built. According to aspects, the outputted annotated geometry 116 is then cached.

The method 300 may optionally proceed to OPERATION 314, where, according to aspects, the client 110 is operable to insert geometry transforms 280 to transform the geometry of the visualization. For example, client 110 may signal the data visualization platform 102 to modify the styling of the visualization (e.g., convert to pixel space, apply snapping, geometry culling, warp effects, hand drawn effects, projections, and 3D surfaces mapping, change the color of certain data points, etc.). According to other aspects, geometry transforms 280 may be inserted by the data visualization platform 102. At OPERATION 316, the annotated geometry 116 is transformed according to the geometry transforms 280. The method 300 then proceeds to OPERATION 318.

In aspects where the client 110 does not implement geometry transforms 280, the method 300 proceeds from OPERATION 312 to OPERATION 318.

At OPERATION 318, the client 110 requests drawing instructions from the data visualization platform 102. For example, the client 110 is operative to perform a recursive walk of the scene graph. In various aspects, the request is handled via an interface provided by the client 110.

At OPERATION 320, the data visualization platform 102 transmits a normalized form of the shared objects and annotated geometry 116 to the client 110. According to various aspects, the transmission is received via an interface provided by the client 110, and the transmission include all or a portion of the annotated geometry 116.

At OPERATION 322, the client 110 renders the visualization. According to aspects, the client 110 passes the shared objects, annotated geometry 116 and formatting properties to an output device 124 such as a monitor, screen, printer, or other display device via the rendering API 120. The method 300 concludes at END 398.

Figure 4:
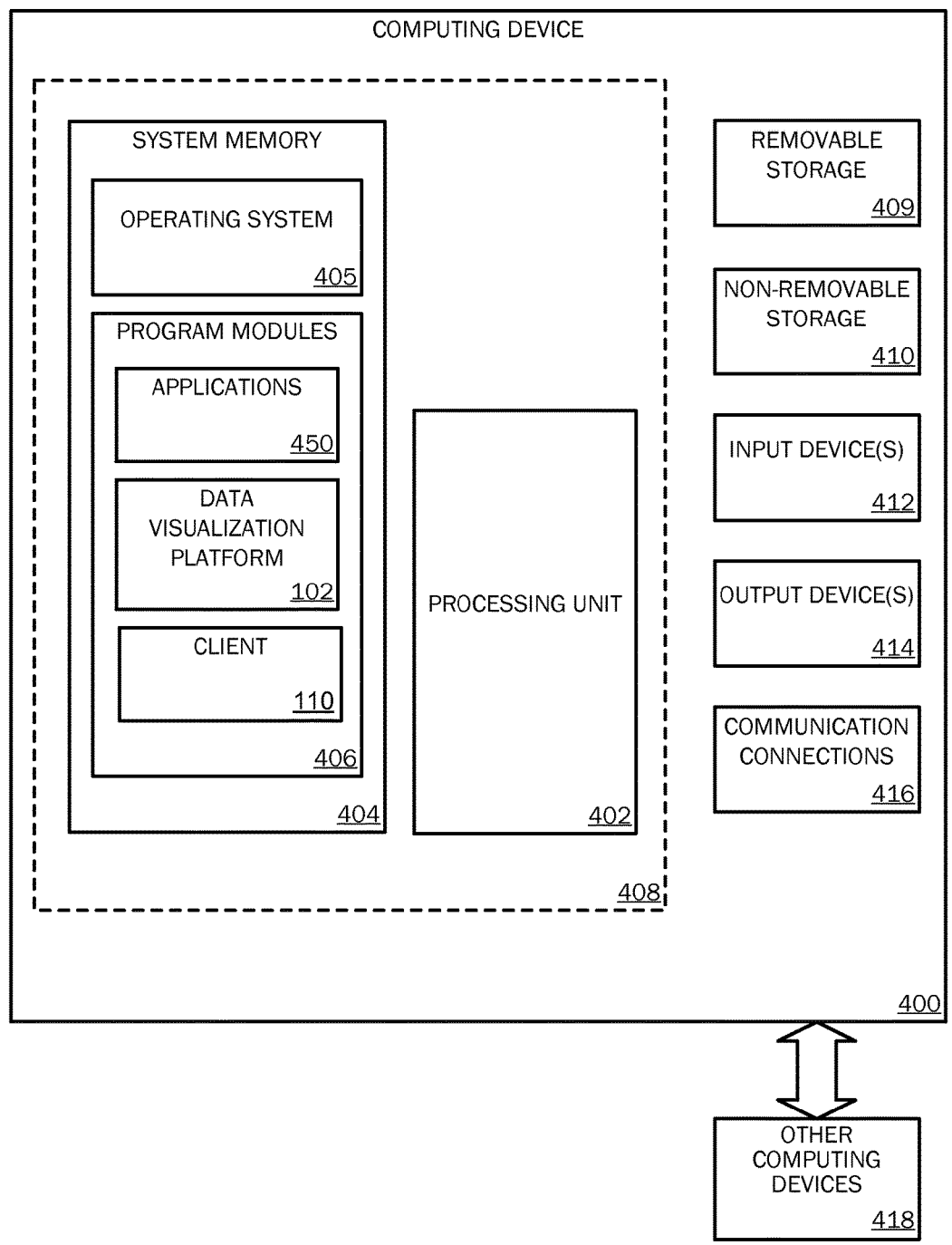
FIG. 4 is a block diagram illustrating example physical components of a computing.
Figure 5A:
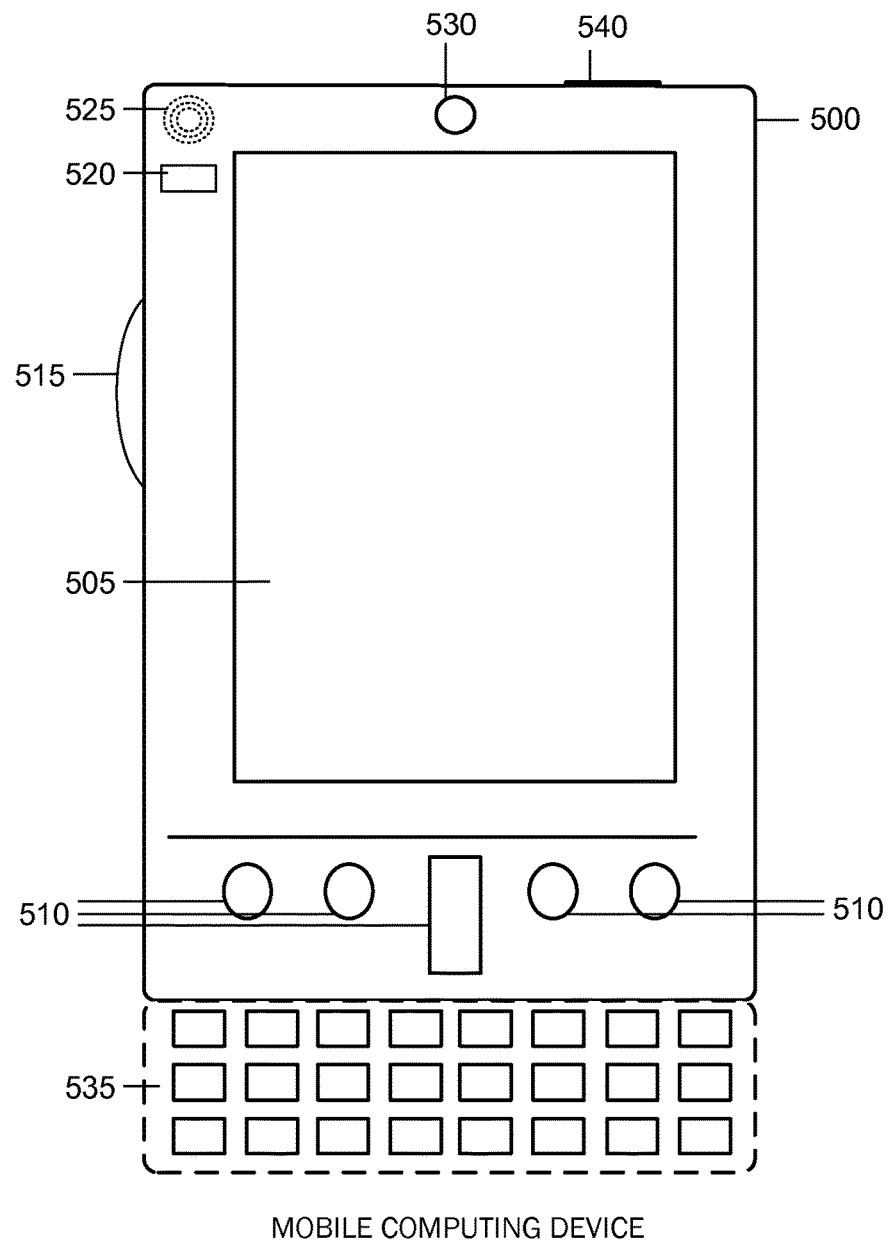
FIGS. 5A and 5B are example block diagrams of a mobile computing device.
Figure 5B:
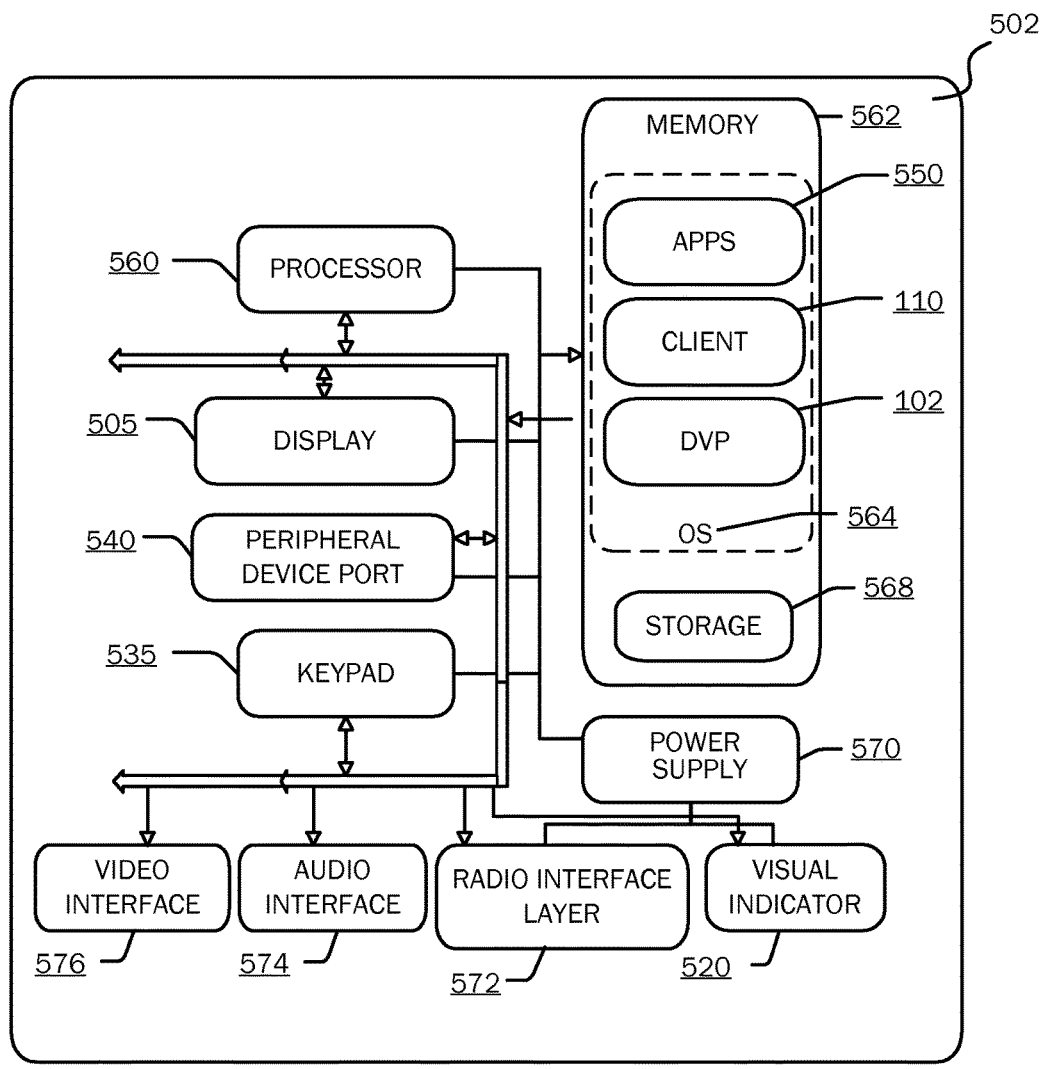
Figure 6:
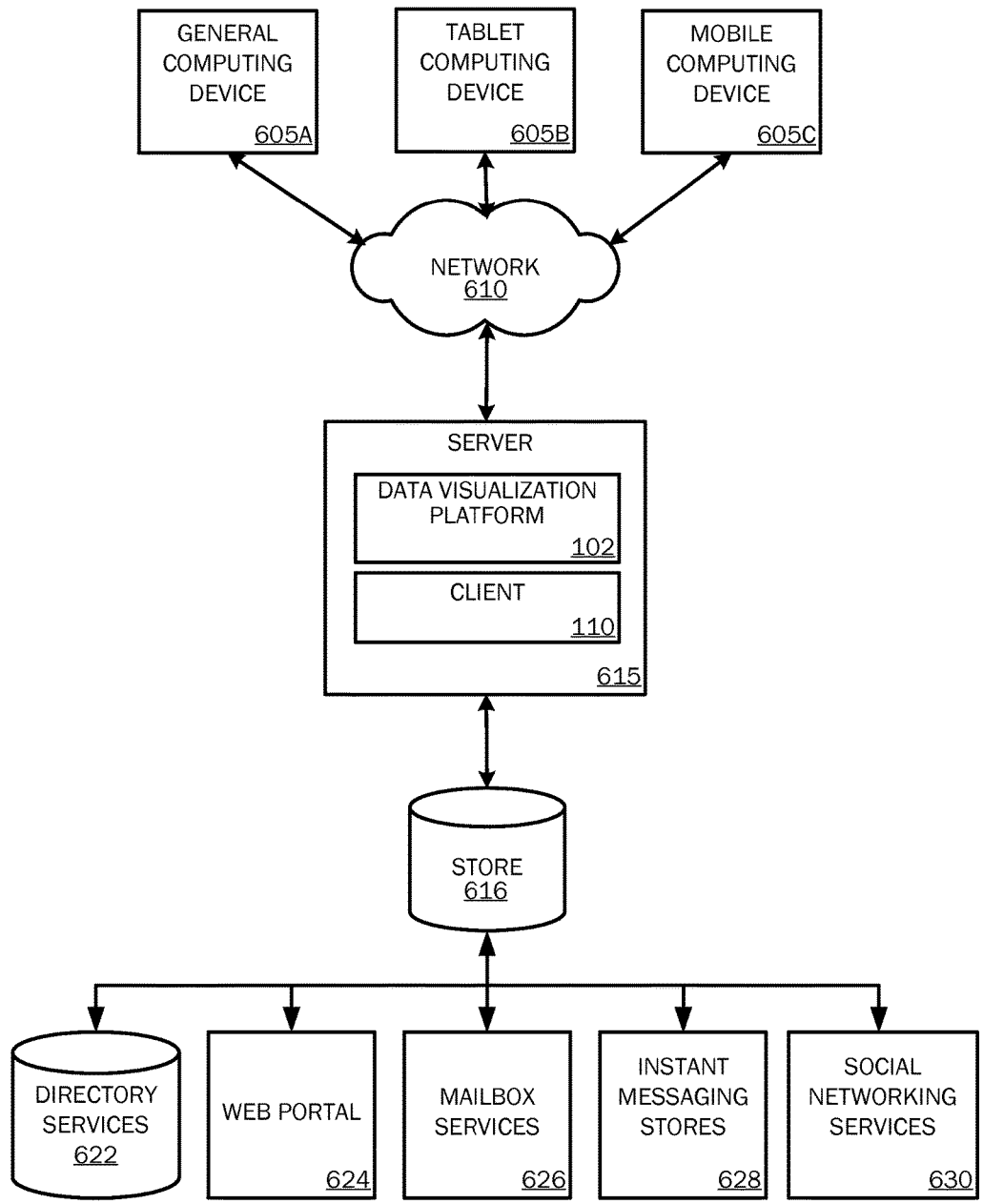
FIG. 6 is an example block diagram of a distributed computing system.

FIGS. 4-6 and the associated descriptions provide a discussion of a variety of operating environments in which examples of the present disclosure may be practiced. However, the devices and systems illustrated and discussed with respect to FIGS. 4-6 are for purposes of example and illustration and are not limiting of a vast number of computing device configurations that may be utilized for practicing aspects of the disclosure, described herein.

FIG. 4 is a block diagram illustrating physical components (i.e., hardware) of a computing device 400 with which examples of the present disclosure may be practiced. The computing device components described below may be suitable for the client device described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more programming modules 406 suitable for running software applications 450, such as client 110. According to an aspect, the system memory 404 may include the data visualization platform 102. The operating system 405, for example, may be suitable for controlling the operation of the computing device 400. Furthermore, aspects of the disclosure may be practiced in conjunction with a graphics library, other operating systems, or any other application program and is not limited to any particular application or system.

This basic configuration is illustrated in FIG. 4 by those components within a dashed line 408. The computing device 400 may have additional features or functionality. For example, the computing device 400 may also include additional data storage devices (removable or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., client 110, data visualization platform 102) may perform processes including, but not limited to, one or more of the stages of the method 300 illustrated in FIG. 3. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects of the disclosure may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In alternative examples, the mobile computing device 500 is a portable phone system, such as a cellular phone. The mobile computing device 500 may also include an optional keypad 535. Optional keypad 535 may be a physical keypad or a "soft" keypad generated on the touch screen display. In various aspects, the output elements include the display 505 for showing a graphical user interface (GUI), a visual indicator 520 (e.g., a light emitting diode), or an audio transducer 525 (e.g., a speaker). In some examples, the mobile computing device 500 incorporates a vibration transducer for providing the user with tactile feedback. In yet another example, the mobile computing device 500 incorporates peripheral device ports 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

One or more application programs 550, for example, client 110, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the data visualization platform 102 may be loaded into memory 562. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications or an audio interface 574 may be used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing data visualization as described above. Content developed, interacted with, or edited in association with the client 110 or data visualization platform 102 may be stored in different communication channels or other storage types. For example, various documents may be stored using a directory service 622, a web portal 624, a mailbox service 626, an instant messaging store 628, or a social networking site 630. The client 110 or data visualization platform 102 may use any of these types of systems or the like for providing data visualization, as described herein. A server 615 may provide the client 110 or data visualization platform 102 to clients 605A-C. As one example, the server 615 may be a web server providing the client 110 or data visualization platform 102 over the web. The server 615 may provide the client 110 or data visualization platform 102 over the web to clients 605 through a network 610. By way of example, the client computing device may be implemented and embodied in a personal computer 605A, a tablet computing device 605B or a mobile computing device 605C (e.g., a smart phone), or other computing device. Any of these examples of the client computing device may obtain content from the store 616.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for graphically representing data in a visualization using a data visualization platform comprising a pipelined one-directional chain of separate stages, the chain of separate stages comprising a data transform stage, a layout transform stage operably connected to the data transform stage, and a geometry transform stage operably connected to the layout transform stage, the method comprising:
receiving, at the data transform stage, a data series transmitted from a client device;
when the data series is to be transformed into a normalized form, transforming, using one or more data transforms in the data transform stage, the data series into the normalized form that is usable by the layout transform stage;
when the data series is received in the normalized form, passing the data series to the layout transform stage using a pass-through transform in the data transform stage;
receiving, at the layout transform stage, the data series;
producing, based on a surface description and using one or more layout transforms in the layout transform stage, annotated geometry for the visualization that comprises data used to render the visualization;
when an appearance of the visualization is to be altered, inserting one or more geometry transforms into the geometry transform stage to produce modified annotated geometry for the visualization that alters the appearance of the visualization when the visualization is rendered at the client device; and
transmitting the modified annotated geometry or the annotated geometry to the client device for rendering and display of the visualization using the modified annotated geometry or the annotated geometry.

2. The method of claim 1, wherein receiving, at the data transform stage, the data series from the client device comprises receiving, at the data transform stage, the data series and the surface description from the client device wherein, the surface description includes one or more of:
a visualization type;
a visualization size; or
a client resolution.

3. The method of claim 1, wherein geometries of objects in the visualization comprise lines and Beziers.

4. The method of claim 1, wherein the data visualization platform and the client device are provided by a single computing device.

5. The method of claim 1, wherein the data used to render the visualization comprises geometry vectors associated with a geometry in the visualization.

6. The method of claim 1, further comprising formatting the visualization in a format that is specified by the client device.

7. The method of claim 1, further comprising prior to transforming the data series into the normalized form, inserting at least one data transform into the data transform stage that is used to transform the data series into the normalized form.

8. The method of claim 1, further comprising prior to producing, based on the surface description and using the one or more layout transforms in the layout transform stage, the annotated geometry for the visualization, inserting at least one layout transform into the layout transform stage that is used to produce the annotated geometry for the visualization.

9. A system for providing a data visualization, comprising:
a processor; and
a memory for storing instructions which, when executed by the processor, cause the processor to perform a method comprising:
receiving, at a data visualization platform, data and a surface description for a visualization, the data visualization platform comprising a pipelined one-directional chain of separate stages including a data transform stage, a layout transform stage operably connected to the data transform stage, and a geometry transform stage operably connected to the layout transform stage;
transforming, by one or more data transforms in a data transform stage, the data into a normalized form or when the data is received in the normalized form, passing the data to a layout transform stage using a pass-through transform in the data transform stage;
receiving, at the layout transform stage, the data in the normalized form and creating annotated geometry for the visualization, the annotated geometry comprising data used to render the visualization; and
when an appearance of the visualization is to be altered, receiving the annotated geometry at a geometry transform stage and inserting one or more geometry transforms into the geometry transform stage to produce modified annotated geometry to alter the appearance of the visualization.

10. The system of claim 9, wherein the method further comprises:
receiving, by an application program interface, the data and the surface description from the client device; and
transmitting, by the application program interface, the annotated geometry or the modified annotated geometry to the client device for rendering of the visualization using the annotated geometry or the modified annotated geometry.

11. The system of claim 9, wherein the surface description comprises one or more of:
a type of the visualization;
a size of the visualization; or
a resolution of the client device.

12. The system of claim 9, wherein an object in the visualization is comprised of lines and Beziers.

13. The system of claim 9, wherein the annotated geometry comprises context information associated with a geometry in the visualization.

14. The system of claim 9, wherein the annotated geometry is associated with a hierarchical scene graph of visual elements.

15. The system of claim 9, wherein the memory stores instructions for transmitting the modified annotated geometry or the annotated geometry to the client device for rendering and display of the visualization based on the modified annotated geometry or the annotated geometry.

16. A computing device, comprising:
a processor; and
a memory for storing instructions which, when executed by the processor, cause the computing device to:
receive, at a data visualization platform, a data series from a client device that is to be represented in a visualization, wherein the data visualization platform comprises a pipelined one-directional chain of separate stages, the chain of separate stages comprising a data transform stage, a layout transform stage operably connected to the data transform stage, and a geometry transform stage operably connected to the layout transform stage;

normalize, using one or more data transforms in the data transform stage, the data series;

provide the normalized data series to the layout transform stage, wherein one or more layout transforms and one or more shared transforms in the layout transform stage generate annotated geometry for the visualization that represents the data series, the one or more shared transforms each including one or more operations common to multiple data series and the one or more layout transforms each including one or more operations used by individual data series; and alter, by one or more geometry transforms in the geometry transform stage, an appearance of the visualization when the visualization is rendered on the client device; and transmit, to the client device, the annotated geometry for rendering and display of the visualization using the annotated geometry.

17. The system of claim 16, wherein the visualization is platform independent.

18. The system of claim 16, further comprising receiving a surface description of the visualization, wherein the one or more layout transforms and the one or more shared transforms generate the annotated geometry based on the surface description.

19. The system of claim 16, wherein the annotated geometry is associated with a hierarchical scene graph of visual elements.

20. The system of claim 16, wherein the method further comprises:

prior to normalizing the data series, inserting at least one data transform into the data transform stage that is used to normalize the data series; and prior to generating the annotated geometry for the visualization, inserting at least one layout transform into the layout transform stage that is used to produce the annotated geometry.

* * * * *